No. 868,727. PATENTED OCT. 22, 1907.
F. S. TOOMBS.
RAILWAY CATTLE GUARD.
APPLICATION FILED JULY 30, 1906.
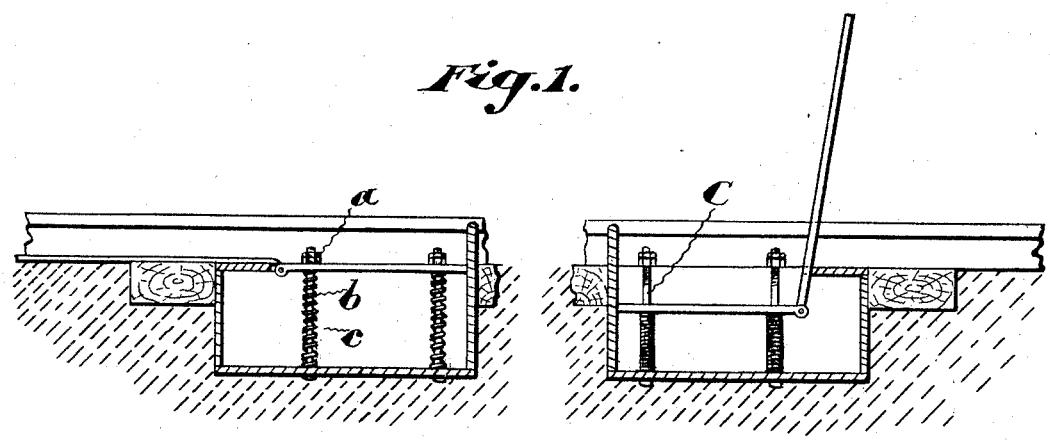
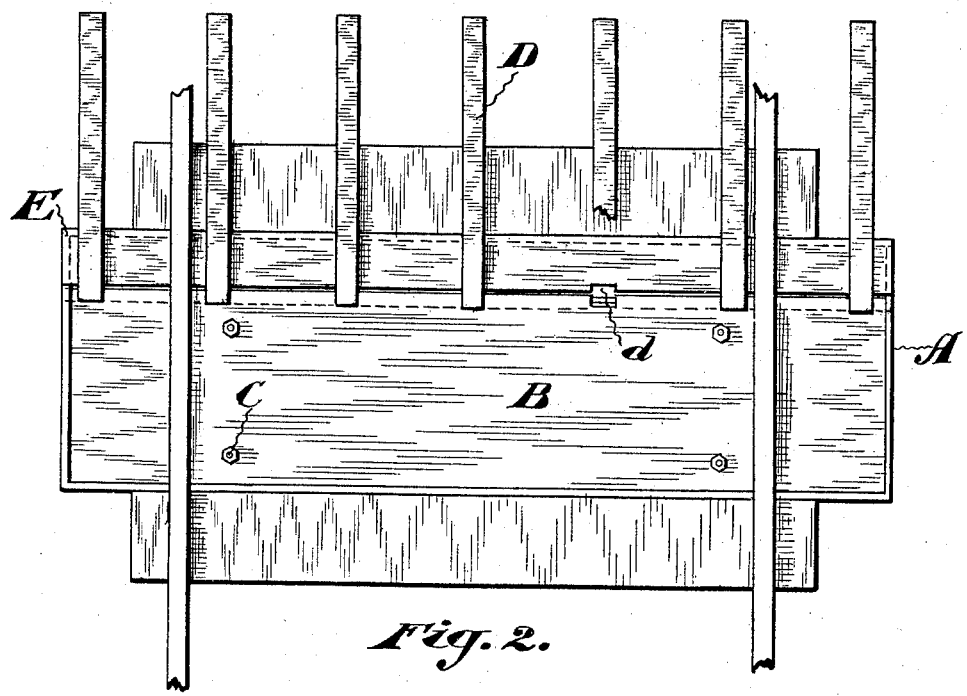
WITNESSES:
INVENTOR.
F. S. TOOMBS
BY RIDOUT & MAYBEE
ATTORNEYS

UNITED STATES PATENT OFFICE.

FRANCIS SCOTT TOOMBS, OF SAULT STE. MARIE, ONTARIO, CANADA.

RAILWAY CATTLE-GUARD.

No. 868,727.  Specification of Letters Patent.  Patented Oct. 22, 1907.

Application filed July 30, 1906. Serial No. 328,564.

*To all whom it may concern:*

Be it known that I, FRANCIS SCOTT TOOMBS, of the town of Sault Ste. Marie, in the Province of Ontario, Canada, have invented certain new and useful Improvements in Railway Cattle-Guards, of which the following is a specification.

My object is to devise a cattle guard which will not only be effective but may remain in position the year round.

My cattle guard is of the type in which a gate or pickets are thrown up in front of an animal trying to walk on the track by the weight of the animal when the latter steps upon a transverse platform, and I have devised a guard of this type which will lie so flat that it will not be in the way of the snow plows used to clear the tracks in winter.

Figure 1 is a side elevation, partly in section, of my improved cattle guard, showing a guard at one side of the crossing elevated, and at the other side in a lowered position. Fig. 2 is a plan view of the guard.

In the drawings like letters of reference indicate corresponding parts in the different figures.

In a box A transverse of the track is fitted a platform B. This platform is vertically movable on bolts C, which are secured to the bottom of the box, and are provided at their upper ends with nuts $a$, by means of which the level of the upper surface of the platform may be adjusted. Coil springs $b$, each fitted on these bolts, tend to maintain the platform in the raised position shown at the right hand of Fig. 1, and serve to limit the downward movement of the platform when the same is depressed. To the forward edge of the platform B are pivoted a series of pickets D. At the front of the platform is located a cross-bar E, having notches in the edge adjacent to the platform in line with the pickets.

It will be noted that the hinges between the pickets and the platform are so arranged that when the guard is down the pickets D will lie flat, as shown at the right hand of Fig. 1. When the platform is depressed the pickets engaging the cross bar E are raised to an almost perpendicular position, as shown at the left hand in Fig. 1. When the pickets are in this position they lie in notches $d$ and are thus securely held in position to resist any side thrust.

From the construction described it follows that immediately an animal places his weight on one of the platforms the pickets will fly up in front of him, and an effectual barrier will be opposed to his further advance. As each picket is entirely independent of the others any one if damaged may be removed and replaced without affecting the remainder.

It is evident also that when the pickets are down no obstructions whatever project above the rails, so that when once the guards have been placed in position they are practically permanent, save for such repairs as may become necessary from time to time.

What I claim as my invention is:

1. In a cattle guard the combination of a spring supported vertically movable platform, a series of pickets independently pivoted at the front of said platform; and a stationary cross bar in front of said platform on which said pickets normally loosely rest whereby as the platform is depressed the pickets are raised towards the vertical.

2. In a cattle guard the combination of a spring supported vertically movable platform, a series of pickets independently pivoted at the front of said platform; and a stationary cross bar in front of said platform on which said pickets normally rest, whereby as the platform is depressed the pickets are raised towards the vertical, the cross bar being notched at its edge adjacent to each picket to form guards and lateral supports for the pickets.

3. In a cattle guard the combination of a spring supported vertically movable platform, a series of pickets independently pivoted at the front of said platform; and a stationary cross bar in front of said platform on which said pickets normally loosely rest, whereby as the platform is depressed the pickets are raised towards the vertical; the springs serving as stops to limit the downward movement of the platform.

4. In a cattle guard the combination of a spring supported vertically movable platform, a series of pickets independently pivoted at the front of said platform; and a stationary cross bar in front of said platform on which said pickets normally rest, whereby as the platform is depressed the pickets are raised towards the vertical, the cross bar being notched at its edge adjacent to each picket to form guards and lateral supports for the pickets; and the springs serving as stops to limit the downward movement of the platform.

5. In a cattle guard, the combination of an open boxing, a spring supported, vertically movable platform operating within the said boxing, a stationary cross-bar at the forward part thereof and pickets independently pivoted at the forward end of said platform and normally resting on said stationary cross-bar, whereby as the platform is depressed, the pickets are raised towards the vertical.

6. In a cattle guard, the combination of an open boxing with its top flush with the road bed, a spring supported, vertically movable platform resting within the open top of said boxing, a stationary cross-bar at the forward end of said boxing, and pickets independently pivoted at the forward end of said platform and normally resting on the stationary cross-bar, whereby as the platform is depressed the pickets are raised toward the vertical, the cross-bar being notched at its edge adjacent to each picket to form guards and lateral supports for the pickets.

FRANCIS SCOTT TOOMBS.

Witnesses:
A. C. BOYCE,
FLORENCE V. TOOMBS.